United States Patent
Chaise

(10) Patent No.: US 9,878,277 B2
(45) Date of Patent: Jan. 30, 2018

(54) REGENERATION OF A HYDROGEN IMPURITY TRAP USING THE HEAT EXITING A HYDRIDE TANK

(71) Applicant: COMMISSARIAT A L'ENERGIE ATOMIQUE ET AUX ENERGIES ALTERNATIVES, Paris (FR)

(72) Inventor: Albin Chaise, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 16 days.

(21) Appl. No.: 14/916,778

(22) PCT Filed: Aug. 8, 2014

(86) PCT No.: PCT/EP2014/067085
§ 371 (c)(1),
(2) Date: Mar. 4, 2016

(87) PCT Pub. No.: WO2015/032587
PCT Pub. Date: Mar. 12, 2015

(65) Prior Publication Data
US 2016/0206989 A1   Jul. 21, 2016
US 2017/0157552 A9   Jun. 8, 2017

(30) Foreign Application Priority Data

Sep. 6, 2013  (FR) ...................................... 13 58571

(51) Int. Cl.
*C01B 3/56* (2006.01)
*F17C 11/00* (2006.01)
(Continued)

(52) U.S. Cl.
CPC ..... *B01D 53/0438* (2013.01); *B01D 53/0446* (2013.01); *B01D 53/0462* (2013.01);
(Continued)

(58) Field of Classification Search
CPC ............ B01D 53/0438; B01D 53/0446; B01D 53/0462; B01D 2253/108;
(Continued)

(56) References Cited

U.S. PATENT DOCUMENTS 3,910,831 A     10/1975  Helart
4,108,605 A *   8/1978  Billings ................ B01D 53/04
                                                    422/212
(Continued)

FOREIGN PATENT DOCUMENTS

DE         101 10 169 B4      9/2001
DE      10 2008 007 557 A1    1/2009
(Continued)

OTHER PUBLICATIONS

International Search Report and Written Opinion dated Oct. 16, 2014 issued in corresponding application No. PCT/EP2014/067085; w/ English partial translation and partial machine translation (23 pages).

*Primary Examiner* — Frank Lawrence
(74) *Attorney, Agent, or Firm* — Westerman, Hattori, Daniels & Adrian, LLP

(57) ABSTRACT

The storing and destocking of hydrogen in a hydride tank (10) comprises purification performed in at least one trap (1, 1A, 1B) filtering the impurities contained in the hydrogen entering the tank to be stored and regeneration of said at least one trap, using the heat carried by the hydrogen exiting the tank after it has been destocked.

22 Claims, 5 Drawing Sheets

Figure 1:
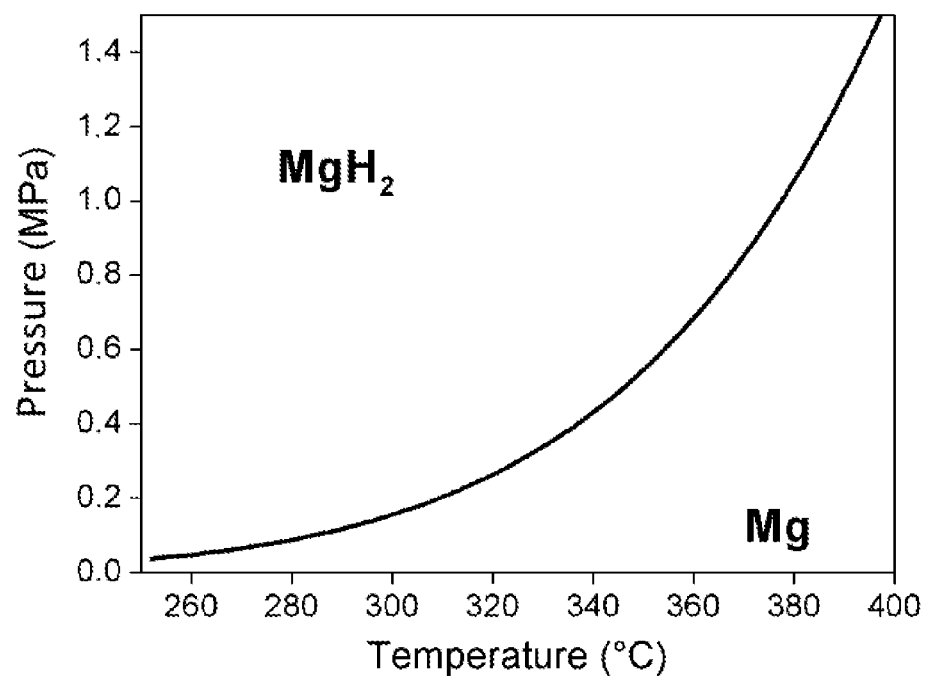

(51) Int. Cl.
*B01D 53/04* (2006.01)
*C01B 3/00* (2006.01)
*C01B 3/50* (2006.01)

(52) U.S. Cl.
CPC .............. *C01B 3/0005* (2013.01); *C01B 3/50*
(2013.01); *C01B 3/56* (2013.01); *F17C 11/005*
(2013.01); *B01D 2253/108* (2013.01); *B01D 2253/116* (2013.01); *B01D 2253/1126* (2013.01); *B01D 2256/16* (2013.01); *B01D 2257/80* (2013.01); *B01D 2259/40052* (2013.01); *B01D 2259/40088* (2013.01); *B01D 2259/40098* (2013.01); *B01D 2259/4525* (2013.01); *F17C 2221/012* (2013.01); *Y02E 60/321* (2013.01); *Y02E 60/324* (2013.01)

(58) Field of Classification Search
CPC ...... B01D 2253/1126; B01D 2253/116; B01D 2256/16; B01D 2257/80; B01D 2259/40052; B01D 2259/40088; B01D 2259/40098; B01D 2259/4525; C01B 3/0005; C01B 3/50; C01B 3/56; F17C 11/005; F17C 2221/012; Y02E 50/321; Y02E 50/324

USPC ........... 206/0.7; 96/108, 121, 109, 111, 146; 95/115; 429/515
See application file for complete search history.

(56) References Cited

U.S. PATENT DOCUMENTS

| 4,173,625 | A | * | 11/1979 | Billings ................. B01D 53/04 423/644 |
|---|---|---|---|---|
| 4,216,198 | A | | 8/1980 | Simons |
| 5,080,875 | A | | 1/1992 | Bernauer |
| 5,250,368 | A | | 10/1993 | Golben et al. |
| 6,444,016 | B2 | | 9/2002 | Oshima et al. |
| 2001/0027724 | A1 | | 10/2001 | Oshima et al. |

FOREIGN PATENT DOCUMENTS

| EP | 0 315 582 A2 | 5/1989 |
|---|---|---|
| FR | 2 411 626 A1 | 7/1979 |
| JP | 62-246699 A | 10/1987 |

\* cited by examiner

REGENERATION OF A HYDROGEN IMPURITY TRAP USING THE HEAT EXITING A HYDRIDE TANK

TECHNICAL FIELD OF THE INVENTION

The invention relates to a process for storing and destocking hydrogen in a hydride tank, comprising a purification step performed on at least one trap that filters out the impurities contained in the hydrogen entering the tank for its storage.

A subject of the invention is also an installation for storing and destocking hydrogen, comprising a hydride tank into which the hydrogen enters to be stored and from which it exits to be destocked, and at least one trap that filters out the impurities contained in the hydrogen entering the tank for storage.

PRIOR ART

Hydrogen storage is a very important point in the development of a hydrogen-based energy vector chain. It is fundamental to store it for applications which need to be transported and it is very advantageous to know how to store it for applications with intermittent primary energy.

The storage of hydrogen may take place in gaseous form, by compressing it up to pressures of 700 bar so as to make its volume acceptable, or in liquid form at very low temperature (about 20 degrees Kelvin).

To reduce the storage volume of hydrogen, it is known practice to exploit the capacity of certain very porous materials for allowing the attachment of hydrogen atoms to the surface. This phenomenon, known as adsorption, is at the present time significant only at low temperature (below the temperature of liquid nitrogen) and is essentially still the subject of fundamental research.

Another solution consists in exploiting the capacity of certain "hydride" materials to achieve reversible absorption and desorption of hydrogen. In metal hydrides (alloy of nickel, titanium and magnesium) for example, the atoms of gaseous dihydrogen enter the material and form a new phase.

One of the aims of storage is to obtain a high volume density of energy. In the case of hydrogen, the hydrogen atoms need to be brought together as closely as possible. Storage in hydrides is the most efficient means for achieving this aim relative to storage under pressure and even to storage in liquid form. However, this is done at the expense of the weight, since on balance it is necessary to add the weight of the hydride material into which the hydrogen becomes inserted. Hydride materials are in powder form, to which they naturally evolve. This comprises two advantages: firstly, it allows hydrogen to access the material uniformly, and secondly, the porosity constitutes a buffer which makes it possible to take up the swelling of material when hydrogen is absorbed.

The hydrogen absorption reaction in the hydride material is exothermic, thus involving an evolution of heat. The desorption reaction which consists in releasing hydrogen is, itself, endothermic, thus involving a necessary input of heat. In general, to absorb hydrogen at a given temperature, dihydrogen gas is injected at a pressure above the equilibrium pressure for formation of the hydride while at the same time evacuating the heat produced. The rate of filling of a hydride tank depends on the efficacy of the cooling heat exchange. On the other hand, to release hydrogen from the hydride tank, the system needs to be placed under negative pressure relative to the equilibrium pressure of the reaction while at the same time supplying heat.

This operating principle constitutes an important safety factor, since hydrogen is released only if there is an input of heat. A second safety factor is associated with the fact that for certain hydrides, the step pressures are not too high for reasonable temperatures (the equilibrium pressure is, for example, about a few bar).

Among the reversible hydrides that operate above 200° C., it is interesting to mention the following based on magnesium: $MgH_2$, $Mg_2Ni$, $LaNi_4Mn$, $NaAlH_4$. They allow hydrogen to be stored reversibly. For example, in the case of magnesium, the reversible reaction is the following: $Mg+H_2=MgH_2$.

Hydrogen undergoes a step of absorption by magnesium according to an exothermic reaction or a desorption step according to an endothermic reaction with magnesium hydride depending on the pressure and the temperature. Typically, the absorption is performed at a pressure of 10 bar absolute and a temperature of 380° C. and the desorption is performed at a pressure of 4 bar absolute and a temperature of 340° C. The curve in FIG. 1 shows the domains of existence of the Mg compound and of the $MgH_2$ compound as a function of the pressure (expressed in MPa) and of the temperature (expressed in ° C.).

Figure 2:
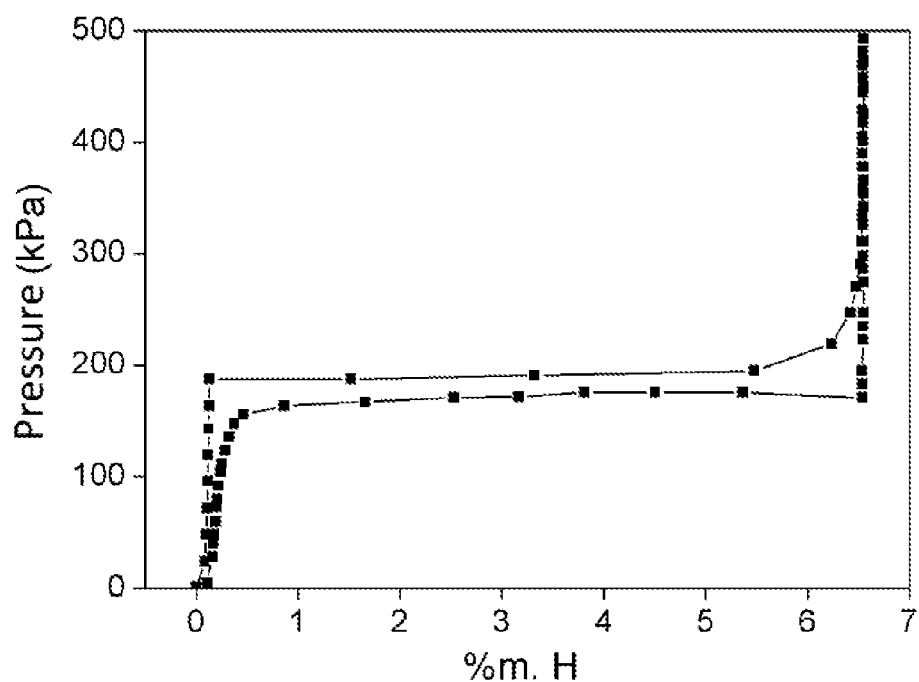

At a given temperature, the equilibrium pressure plateau is horizontal for the compounds Mg and $MgH_2$: the equilibrium pressure does not depend on the hydrogen composition, as shown by the curve in FIG. 2 (the x-axis of which is expressed as a mass percentage of hydrogen and the y-axis of which is the pressure expressed in kPa). For hydrides other than magnesium hydride, the equilibrium pressure depends on the hydrogen content of the hydride in the majority of cases.

Furthermore, magnesium hydride, like most hydrides, is very reactive towards water, oxygen, sulfur-based and chlorinated compounds, carbon monoxide and hydrocarbons. Thus, a low concentration of these compounds in hydrogen significantly degrades the storage performance of the hydrides. Now, for example, in an application in which hydrogen is generated by electrolysis, a large amount of water and oxygen are present in the hydrogen to be stored in the hydride tank. It is thus important to protect the magnesium of these hydrides, in particular from water or oxygen, but also from other pollutants present, for example, in the hydrogen derived from the reforming of natural gas.

Hydrides are used in tanks that are generally pressure chambers. Hydride tanks are often equipped with a heat exchange system which allows the hydride to be supplied with the heat required for the hydrogen desorption reaction and to evacuate the heat released by the hydride during the hydrogen absorption reaction. An alternative is to store the reaction energy close to the hydride in a phase-change material.

In recent years, tanks using magnesium hydride for storing hydrogen have thus been developed. Two variants of such tanks are currently manufactured and sold: a first variant consists in surrounding the tanks with a system for storing the reaction heat which is isothermal (340° C.) since it involves a change of phase of a metal alloy. A second variant consists in heating and cooling the tanks by means of a circulation of oil close to the hydride (300 to 380° C.).

As indicated previously, this type of hydrogen storage must be protected against pollutants that are potentially present in the hydrogen to be stored, which might deteriorate the functioning of the tank at the hydride level.

The conventional way of purifying hydrogen is to use a trap containing a material that is capable of reversibly fixing the impurities by adsorption. The term "adsorption" means that a weak chemical bond (hydrogen bond, Van Der Weals forces) makes it possible to bind a gaseous molecule at the surface of a porous material. The material may be in the form of powder or granules (compressed powder). The material may be molecular sieves, an activated alumina or a silica gel depending on the type of impurity to be trapped and depending on the concentrations upstream and downstream of the trap. Among the molecular sieves, natural or synthetic zeolites are particularly suitable for purifying hydrogen for storage on hydrides. These materials have the capacity of trapping the impurities present in hydrogen at a temperature in the region of room temperature, and of returning the impurities when their temperature increases (generally above 200° C.) and when the partial pressure of pollutants decreases. The term "regeneration" refers to the process that consists in increasing the temperature of the material and in flushing it with a clean gas to remove the impurities previously adsorbed by the material.

The impurities to be trapped are constituted in priority of water, but may also be among $O_2$, $CO$, $CO_2$, $N_2$, $SO_2$, $H_2S$, $KOH$, $HCl$ and organic compounds. Several zeolites exist, the structure of which is adapted to adsorb a certain type of pollutant.

To purify small amounts of hydrogen, a trap consisting of a cartridge that can be dismantled (i.e. in the form of a small pressure chamber containing a material that is capable of reversibly binding impurities by adsorption) may be used. This type of trap must be returned to the supplier to be regenerated, which makes it inapplicable for large amounts of hydrogen to be purified.

In installations that require a large amount of hydrogen, a purification device with two traps operating alternately is very often used. When one of the traps is in service, the other is regenerated. These traps also contain a material that is capable of reversibly binding impurities by adsorption. This makes it possible to perform continuous purification of the hydrogen stream. Two regeneration modes are commonly used:

temperature modulation: a source of external energy (circulation of oil or electrical resistance) is used to heat the material and regenerate it, which greatly complicates the system and consumes energy, pressure modulation: the regeneration is performed without a temperature increase but by lowering the pressure of gas around the material, which does not make it possible to exploit the full capacity of the material.

Devices using two traps are bulky and require greater investment. However, other solutions are possible for purifying hydrogen upstream of a hydride tank, which offer the possibility of minimizing the volume occupied by the purification device: the purification does not need to be continuous since the tank absorbs only for a certain time. The trap may thus be dimensioned only for the storage capacity of the hydrogen tank. Furthermore, the purification device may be regenerated at each cycle. This minimizes the mass of material to be used and consequently the cost of an installation.

The solution described in FR 2 411 626 A1 uses a catalytic reformer to transform the oxygen contained in hydrogen into water, followed by molecular sieves to trap the water. The hydrogen absorbed at a pressure above 10.5 bar by the tank is thus free of water and oxygen. The regeneration phase of the sieves is, however, problematic since it is based on the pressure difference between the absorption of hydrogen and the desorption to clean the filter and to take away for desorption the water adsorbed in the molecular sieves. This well-known process does not operate if the inlet pressure is only slightly higher (or lower than) than the outlet pressure of the tank and it is then impossible to regenerate the filter, which becomes saturated with water and no longer protects the hydride tank from humidity. Furthermore, the absorption pressure must be greater than 10.5 bar. These principles cannot be applied to magnesium-based hydride tanks, for which the hydrogen absorption pressure is generally less than 10 bar and the outlet pressure may be 6 bar.

The solution described in U.S. Pat. No. 5,250,368, applied to electrical batteries that give off hydrogen, proposes to trap the moisture of hydrogen in molecular sieves and to heat them electrically in order to extract the moisture therefrom in a regeneration phase. This method is efficient, but gives rise to a loss of yield since electrical energy must be drawn from the battery to heat the molecular sieves.

OBJECT OF THE INVENTION

The aim of the present invention is to propose a solution for storing and destocking hydrogen in a hydride tank which overcomes the drawbacks listed above.

In particular, an object of the invention is to provide such a solution, which makes it possible:

to be particularly suited to the use of magnesium-based hydrides, but without this being limiting, to obtain good purification and regeneration efficiency, while at the same time having a good storage and destocking yield, to be applicable for large amounts of hydrogen to be purified, to perform regeneration in place and optionally continuously.

These objects may be achieved by a process for storing and destocking hydrogen in a hydride tank, comprising a purification step performed on at least one trap that filters the impurities contained in the hydrogen entering the tank to be stored and a step of regenerating said at least one trap, using the heat carried by the hydrogen exiting the tank after it has been destocked.

Preferentially, the regeneration step is stopped after a predefined time of performing the regeneration or when the moisture content of the hydrogen stream exiting said at least one trap is below a predefined threshold.

In a preferential embodiment, the process comprises the following successive cycle of steps:

said purification step, a step of absorption, by the hydrides of the tank, of the purified hydrogen exiting said at least one trap, a step of desorption of the hydrogen by the hydrides of the tank, said regeneration step in which the heat carried out of the tank by the hydrogen destocked at the time of the desorption step is used to heat the material of said at least one trap that is capable of reversibly retaining during the purification step the impurities contained in the hydrogen prior to said absorption.

Preferentially, the regeneration step comprises a step of heat exchange, especially contactless, between all or part of the hydrogen stream that has undergone said desorption and said material of the trap.

The regeneration step may comprise a step of evacuating from the trap impurities filtered and retained beforehand by said material. In particular, the regeneration step may comprise:

a step of separation of the total stream of hydrogen which has undergone said desorption into first and second separate streams, a step of using only said first stream to perform said evacuation step, and a step of heat exchange, especially contactless, between only said second stream and said material such that the heat generated during the desorption step and carried by said second stream is used to heat said material in a manner allowing said evacuation step to be performed by the first stream.

This step of using only said first stream preferentially comprises flushing of said material with said first stream with direct contact with said material.

The process may also comprise a step of expelling said first stream and the impurities released from said material during said evacuation step to the external atmosphere, performed after said evacuation step, and/or a step of cooling said first stream and the impurities released from said material during said evacuation step to condense the liquid water, performed especially on a cooling-condenser element, followed by a step of mixing between said first cooled stream and said second stream.

Preferentially, the regeneration step comprises:

a step of supplying a stream of neutral gas such as argon or nitrogen, originating from a source of neutral gas, a step of using said stream of neutral gas to perform said evacuation step, and a step of heat exchange, especially contactless, between the total stream of hydrogen that has undergone said desorption and said material so that the heat generated during the desorption step and carried by said total stream is used to heat said material in a manner allowing said evacuation step to be performed.

In particular, said step of using said stream of neutral gas may comprise flushing said material with said stream of neutral gas with direct contact with said material and the process may comprise a step of expelling said stream of neutral gas and impurities released from said material during said evacuation step to the external atmosphere, performed after said evacuation step.

The cycle of steps preferentially comprises, after the regeneration step, a step of cooling said at least one trap, especially at the level of said material, performed before performing a following cycle of steps. In particular, said step of cooling said at least one trap may comprise the following successive steps:

a step of cooling the hydrogen exiting the reactor after the desorption step, performed on a cooling element, a step of heat exchange, especially contactless, between the hydrogen which has undergone said cooling step and said material of said at least one trap, so that the hydrogen takes heat from said material, a step of evacuating from said at least one trap heat taken from said material during said step of heat exchange, performed by evacuating from said at least one trap the hydrogen that has undergone said step of heat exchange.

Said purification step may be performed alternately on first and second separate traps operating in a synchronized manner such that the step of cooling of the first trap is performed during the purification step performed by the second trap and such that the step of cooling of the second trap is performed during the purification step performed by the first trap.

A hydrogen storage and destocking installation may comprise a hydride tank in which hydrogen enters to be stored and exits therefrom to be destocked, at least one trap that filters out the impurities contained in the hydrogen entering the tank to be stored and computer software and/or hardware means which perform such a process, including a device which ensures that the regeneration of said at least one trap uses the heat carried by the hydrogen exiting the tank after it has been destocked.

Said at least one trap may especially comprise a material that is capable of reversibly retaining the impurities contained in the hydrogen prior to its storage in the tank, and in that said device comprises a heat exchange element for performing heat exchange, especially contactless, between all or part of the total stream of hydrogen exiting the tank and said material of the trap.

This device may comprise elements for flushing said material with a gaseous stream with direct contact with said material such that said gaseous stream evacuates from the trap impurities filtered and retained beforehand by said material. In particular, the installation may comprise elements which ensure that said gaseous stream is constituted by a fraction of the total stream of hydrogen exiting the tank.

The hydride tank preferentially comprises magnesium-based hydrides.

SUMMARY DESCRIPTION OF THE DRAWINGS

Figure 3:
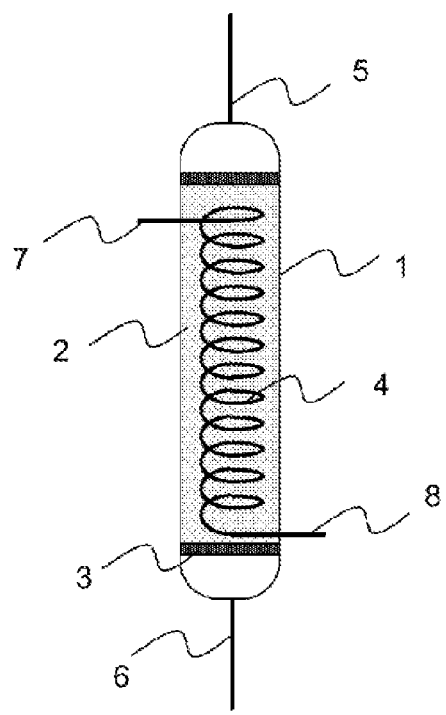
Figure 4:
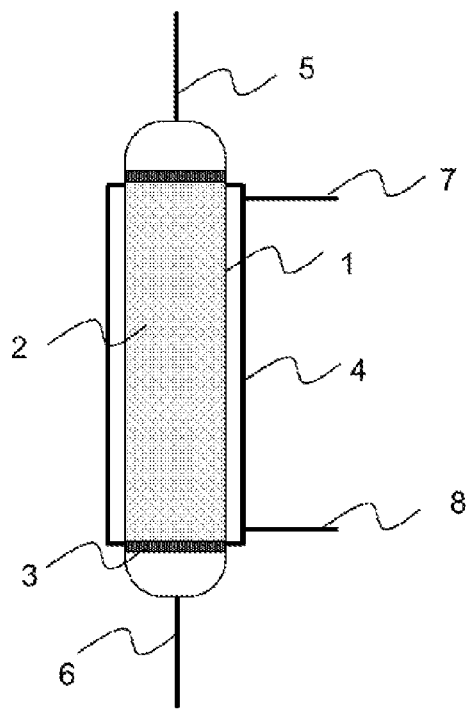
Figure 5:
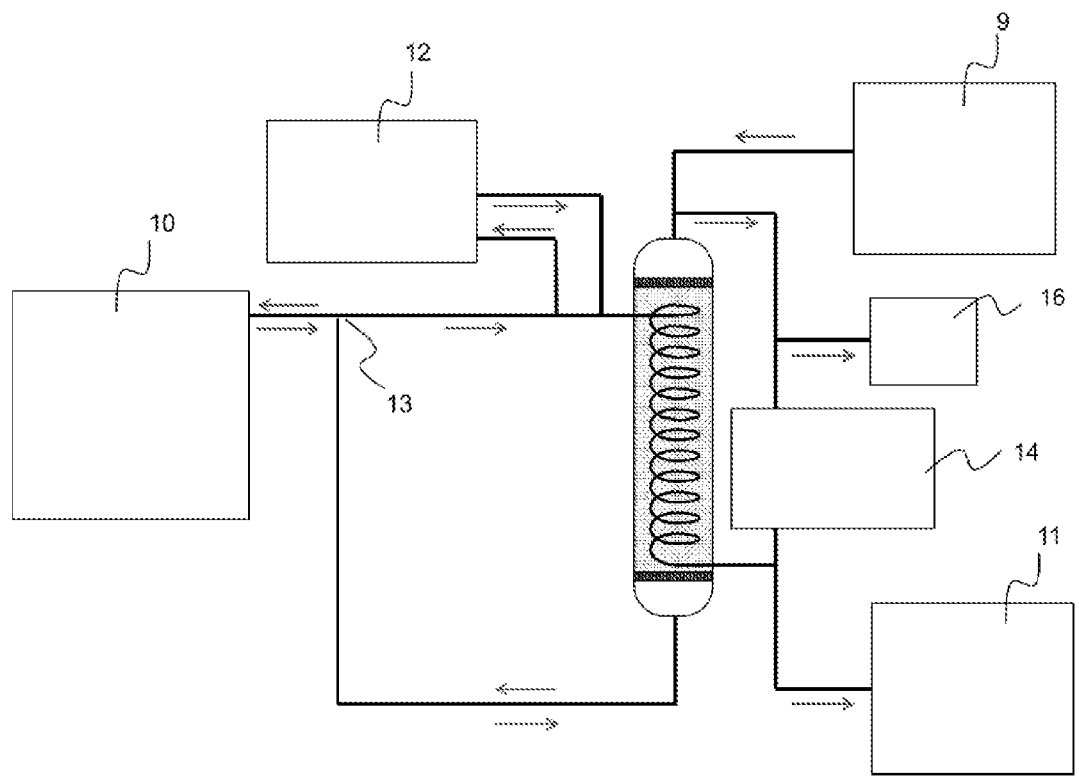
Figure 6:
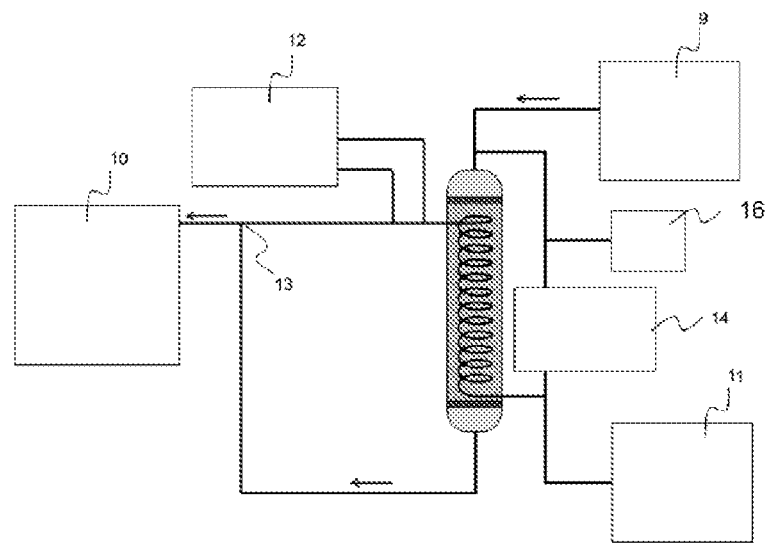
Figure 7:
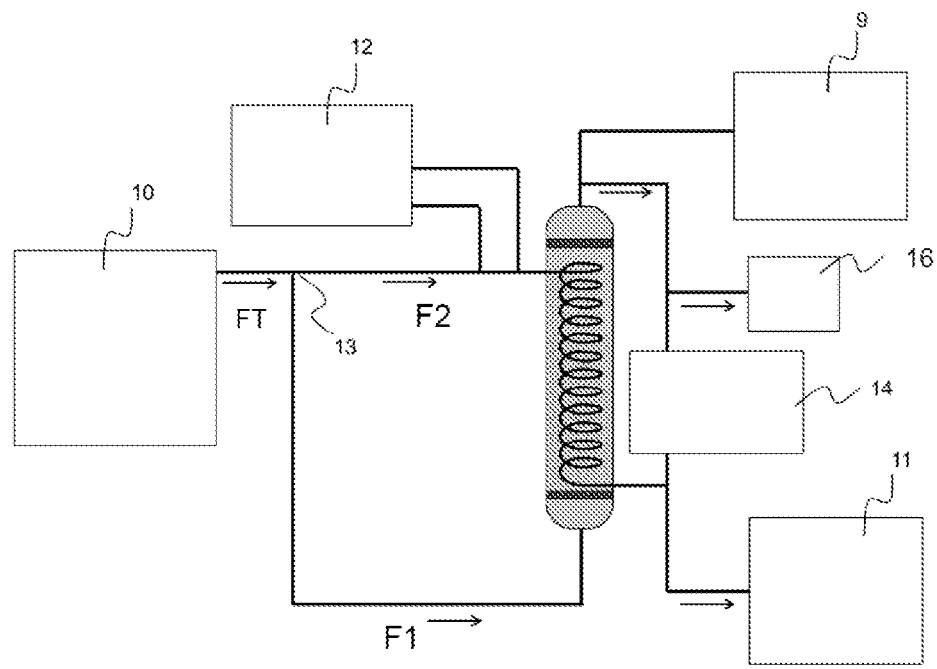
Figure 8:
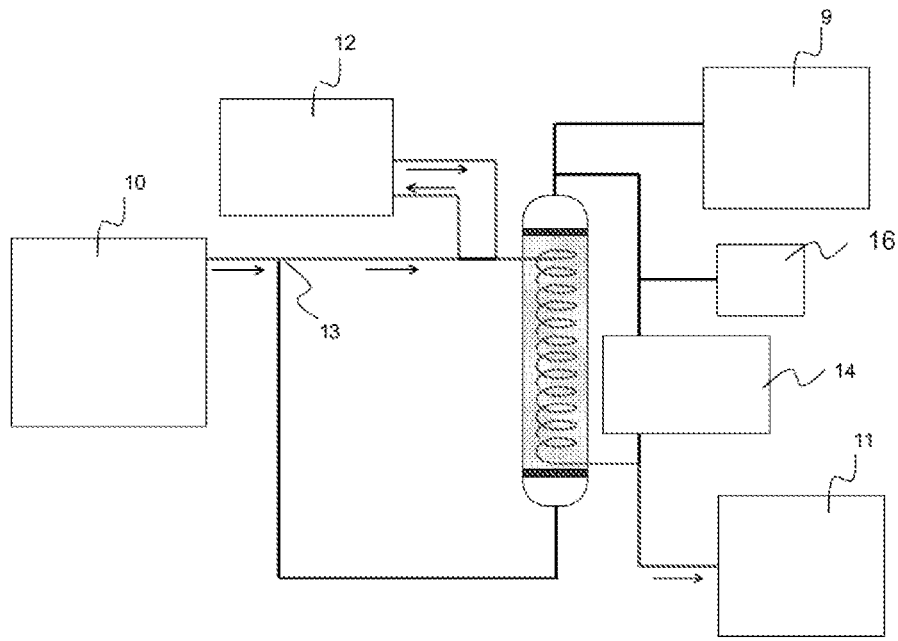
Figure 9:
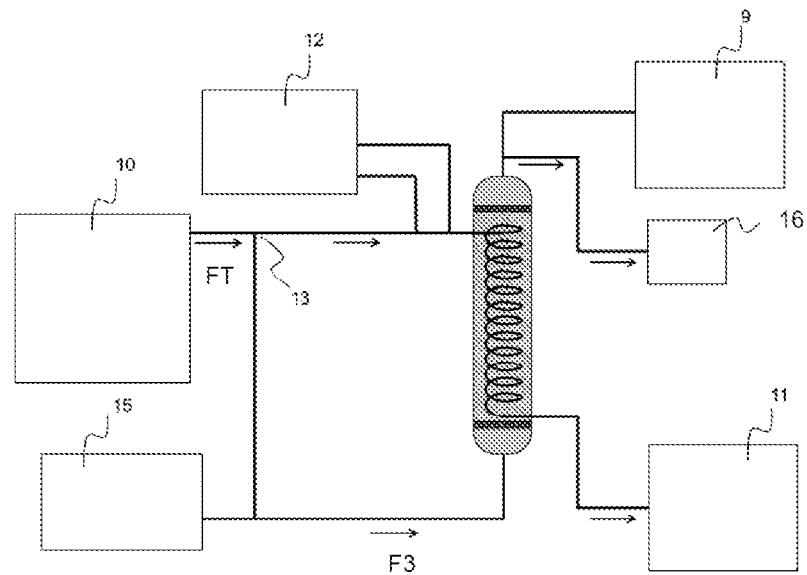
Figure 10:
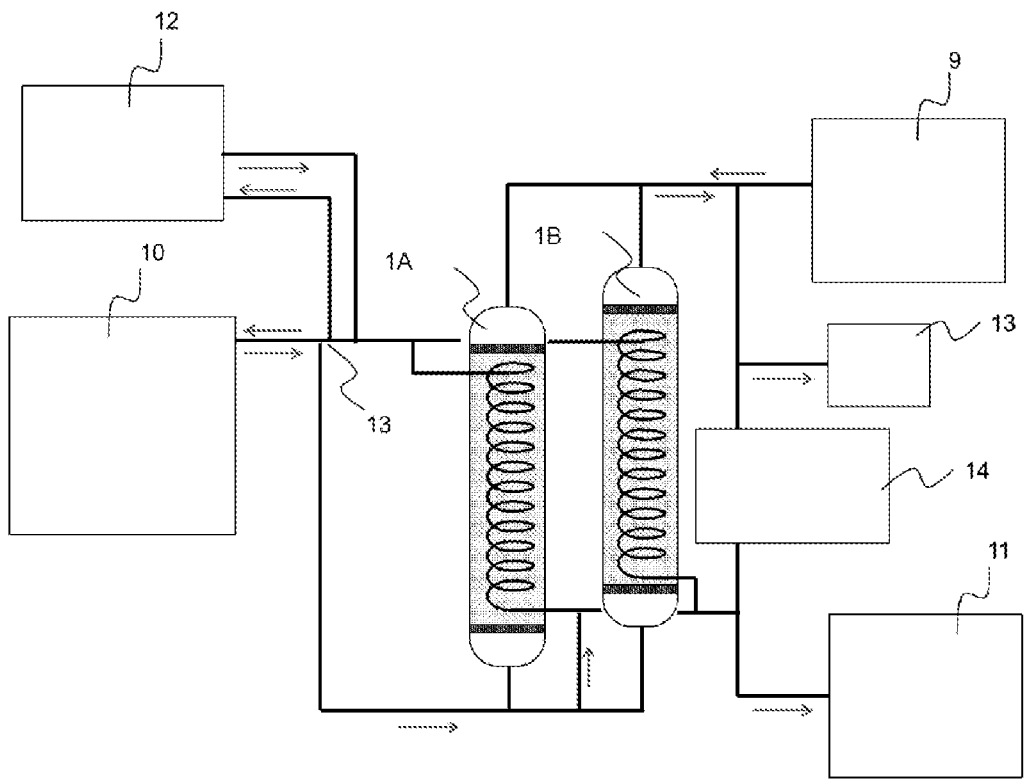

Other advantages and characteristics will emerge more clearly from the description that follows of particular embodiments of the invention, which are given as nonlimiting examples and represented in the attached drawings, in which:

FIG. 1 illustrates the curve of equilibrium pressure between the compounds Mg and $H_2$ and $MgH_2$ as a function of the temperature, FIG. 2 illustrates the equilibrium pressure curve at 300° C. as a function of the hydrogen composition, FIGS. 3 and 4 represent two examples of traps for performing the invention, FIG. 5 illustrates a first example of an installation for storing and destocking hydrogen in a hydride tank according to the invention, FIG. 6 represents the installation of FIG. 5 and the circulation of hydrogen between its various components during a phase of storing and purifying hydrogen, FIG. 7 represents the installation of FIG. 5 and the circulation of hydrogen between its various components during a phase of destocking hydrogen and of regenerating the trap, FIG. 8 represents the installation of FIG. 5 and the circulation of hydrogen between its various components during a phase of destocking hydrogen and of cooling the trap, FIG. 9 represents a second example of an installation for storing and destocking hydrogen in a hydride tank according to the invention, during a phase of destocking hydrogen and of regenerating the trap, FIG. 10 represents a third example of an installation for storing and destocking hydrogen in a hydride tank according to the invention, with two traps operating alternately.

DESCRIPTION OF PREFERENTIAL EMBODIMENTS OF THE INVENTION

In general, and with reference to FIGS. 3 to 10, the invention relates to a process and an installation for storing and destocking hydrogen in a hydride tank 10. The hydride tank 10 may especially comprise magnesium-based hydrides, without this limiting the field of application.

The solution proposed is particularly suited to hydrides operating at low pressure (1 to 20 bar) and at high temperature (between 200 and 400° C.). These hydrides must, by their nature, be brought to high temperature in order to be able to release the stored hydrogen. The hydrogen then exits hot from the tank. This may concern the field of hydrogen storage for feeding fuel cells, hydrogen turbines, heat engines or the industry using hydrogen.

The process comprises a purification step performed on at least one trap that filters out the impurities contained in the hydrogen entering the tank 10 for storage and a step of regenerating said at least one trap, using the heat carried by the hydrogen exiting the tank 10 after it has been destocked.

The impurities are constituted in priority of water, but may also be among $O_2$, CO, $CO_2$, $N_2$, $SO_2$, $H_2S$, KOH, HCl and organic compounds.

Thus, the general principle consists in using the heat carried by the hydrogen during desorption from the hydride tank 10 to regenerate a material contained in the trap and capable of reversibly retaining impurities, this regeneration consisting in extracting from the material the impurities previously adsorbed during the hydrogen storage phase.

With reference to FIG. 5, the hydrogen storage and destocking installation comprises a hydride tank 10 in which hydrogen enters to be stored and exits therefrom to be destocked, at least one trap 1 for filtering out the impurities contained in the hydrogen entering the tank 10 to be stored and computer software and/or hardware means for performing the process that will be detailed later, including a device which ensures that the regeneration of said at least one trap 1 uses the heat carried by the hydrogen exiting the tank 10 after it has been destocked. In particular, the installation may comprise for this purpose at least one of the traps 1 of FIGS. 3 and 4: each trap 1 of FIGS. 3 and 4 is arranged so as to filter the impurities contained in the hydrogen to be stored in the tank 10 and ensures that its regeneration uses the heat carried by the hydrogen exiting the tank 10 after it has been destocked. With reference to FIG. 10, and as will be detailed later, the installation may comprise two such traps 1 arranged and controlled so as to operate alternately.

For reasons of clarity, elements that have identical functions in FIGS. 3 and 4, despite having different structures, are named with identical references.

With reference to FIGS. 3 and 4, said at least one trap 1 comprises a material 2 that is capable of reversibly retaining the impurities contained in hydrogen prior to its storage in the tank 10. The trap comprises a heat exchange element 4 which ensures heat exchange, especially contactless, between all or part of the total hydrogen stream exiting the tank 10 and the material 2 of the trap 1.

In general, the device which ensures that the regeneration of said at least one trap 1 uses the heat carried by the hydrogen exiting the tank 10 after it has been destocked comprises elements for flushing the material 2 with a gaseous stream with direct contact with the material 2 such that this gaseous stream evacuates from the trap 1 impurities filtered and retained beforehand by the material 2.

As detailed later, the installation may comprise elements which ensure that this gaseous stream is constituted by a fraction of the total hydrogen stream exiting the tank 10 or alternatively by a stream of neutral gas.

Still with reference to FIGS. 3 and 4, each trap 1 is a chamber subjected to the internal pressure. This chamber is filled with the material 2, which is especially in granular form. The amount of material 2 present in the trap 1 is preferably between one and five times the minimum amount required for purification of the mass of dihydrogen that the hydride tank 10 may contain at maximum.

The trap 1 is preferentially placed substantially vertically. It comprises the gas taps 5 and 6 at the top and bottom ends, respectively, allowing the hydrogen to diffuse into the trap 1 on contact with the material 2.

The trap 1 comprises a filter 3 at each end which prevents the material 2 from exiting the trap 1, but allows the passage of hydrogen to the taps 5 and 6.

The heat exchanger 4 is arranged inside or around the trap 1 so that hydrogen circulating in the heat exchanger 4 can heat or even cool the material 2. This heat exchanger 4 may be, for example, a sleeve around the trap 1, a coil in or around the trap 1, a bundle of tubes passing through the material 2, or a tube equipped with fins inside the trap 1. It has an inlet 7 on the top side of the trap 1 and an outlet 8 on the bottom side.

The trap 1 is connected via the top at the tap 5 to the feed source 9 of contaminated hydrogen and via the bottom at the tap 6 to the tank 10. Thus, during the storage of hydrogen in the tank, the stream of gas cannot fluidize the material 2. Fluidization of the material 2 would reduce the efficiency by reducing the contact between the material 2 and the gas which flushes it.

Preferentially, the step of regeneration of said at least one trap 1 is stopped after a predefined time of operating of the regeneration or when the moisture content of the hydrogen stream exiting said at least one trap 1 is below a predefined threshold. For example, the regeneration may be stopped when the dew point of the gas exiting the trap is below room temperature. However, it may be chosen to continue the regeneration down to a lower dew point. This depends on the desired quality of the gas during the purification-storage phase: the more thorough the regeneration, the more the trap will be able to generate a pure gas.

Preferably, the process may comprise the cycle of the following successive steps:
  the purification step mentioned above,
  a step of absorption, by the hydrides of the tank 10, of the purified hydrogen exiting said at least one trap 1,
  a step of desorption of the hydrogen by the hydrides of the tank 10,
  the regeneration step mentioned above, in which the heat carried out of the tank by the hydrogen destocked at the time of the desorption step is used to heat the material 2 of said at least one trap 1 that is capable of reversibly retaining during the purification step the impurities contained in the hydrogen prior to said absorption.

FIG. 6 shows the installation of FIG. 5 and the circulation of hydrogen between its various components during a hydrogen storage and purification phase.

During the hydrogen storage phase and the step of absorption of hydrogen by the hydrides of the tank 10, the hydrogen stream originates from the hydrogen feed source 9. The hydrogen temperature is close to room temperature (for example less than or equal to 50° C.). The hydrogen is brought to the top of the trap 1 via the tap 5 and through the material 2. The hydrogen purified by the material 2 thus flushed and traversed exits the trap 1 at the tap 6 to be conveyed to the hydride tank 10 in which it will be stored by absorption in a hydride.

Moreover, the regeneration step comprises a step of heat exchange (FIGS. 7 and 9), especially contactless, performed at the heat exchanger 4, between all or part of the hydrogen stream that has undergone desorption and the material 2 of the trap 1. This is one of the reasons for the existence of the heat exchanger 4, whether it is arranged as a coil inside the trap 1 as in FIG. 3 or outside the trap 1 as in FIG. 4. As will be detailed later, the heat exchanger 4 may also be used in the context of subsequent cooling of said at least one trap 1, with reference to FIG. 8.

The heat exchanger 4 is connected to the outlet of the hydride tank 10 via its tap 7 arranged in the top part of the trap 1 and is connected to a user device 11 for the destocked hydrogen via its tap 8 in the bottom part of the trap 1.

By means of this increase in temperature of the material 2 via the heat exchanger 4 in which circulates hydrogen exiting the tank 10, the impurities contained in the material may be evacuated from the material: the regeneration step comprises a step of evacuating from the trap 1 impurities filtered and retained beforehand by the material 2.

In a first variant with reference to FIG. 7 during a phase of destocking of the hydrogen and of regeneration of the trap 1, the regeneration step comprises in order to achieve this:
    a step of separation, at a separating element 13, for example in T form, of the total stream FT of hydrogen that has undergone desorption into a first stream F1 and a second stream F2 which are different from each other,
    a step of using only the first stream F1 to perform the step of evacuating the impurities from the trap 1,
    and a step of heat exchange, especially contactless, between only the second stream F2 and the material 2 such that the heat generated during the desorption step and carried by the second stream F2 is used to heat the material 2 in a manner allowing the implementation of the step of evacuating the impurities from the trap 1 by the first stream F1.

The separating element in T form then has a first inlet/outlet in fluid communication with the tank 10, a second inlet/outlet in fluid communication with the tap 6 of the trap 1 and a third inlet/outlet in fluid communication with the tap 7.

Preferably, this step of using only the first stream F1 to evacuate the impurities from the trap comprises the flushing of the material 2 with the first stream F1 with direct contact with the material 2.

An implementation of these principles may be the following. During the phase of destocking of the hydrogen in the tank 10 by desorption of this hydrogen by the hydrides, the total stream FT of hydrogen is released by the tank 10 at a temperature of between 200 and 400° C. This stream FT is divided at the separating element 13 into the second stream F2 which will flow through the heat exchanger 4 and the first stream F1 which will pass through the trap 1 to be in contact with the material 2. The advantage of dividing the streams F1 and F2 is to avoid excessive gas speeds in the trap 1 which might fluidize the material 2 and/or create substantial pressure losses on either side of the trap 1.

The second stream F2 preferentially constitutes between 50% and 100% of the total stream FT of hydrogen and is directed into the heat exchanger 4 so that the heat of the hydrogen is transferred to the material 2 without coming into direct contact with this material 2. This stream F2 of hydrogen heats the trap 1 and the material 2 to a temperature of between 200 and 400° C., which allows the material 2 to release the impurities, in particular the moisture adsorbed. The stream F2 of hot hydrogen enters via the top of the exchanger 4 at the tap 7 so as to favour the zone of the trap 1 which has been the most contaminated during the preceding phase. This last point makes it possible to perform regeneration on partial cycles of filling of the hydride tank 10: if this tank is partially cycled, only the material 2 located in the top part of the trap 1 will be saturated with water. This zone must be regenerated in priority. The stream F2 of hydrogen then exits the exchanger 4 via the tap 8 to be conveyed to the user device 11. This hydrogen is dry. It may optionally be cooled before being used.

Preferentially, the process comprises in a first variant a step of expelling the first stream F1 and the impurities released from the material 2 during the step of evacuating to the external atmosphere 16, performed after the evacuation step.

However, in a very advantageous second variant, the process may comprise, alternatively or in combination with the expulsion step, a step of cooling the first stream F1 and the impurities released from the material 2 during the evacuation step to condense the liquid water, especially performed in a cooling-condenser element 14, followed by a step of mixing between the first cooled stream and the second stream F2.

One way of performing the process described previously is to envisage that the first stream F1 be constituted by a proportion of between 0 and 50% of the total stream FT of hydrogen which exits the hydride tank 10. The first stream F1 constitutes a bearing hydrogen stream since it bears impurities for the purpose of evacuating them from the material 2. It enters the trap 1 via the tap 6 in order to flush the material 2 and to evacuate the contaminants from the trap 1. Flushing of the material 2 with the first stream F1 takes place from the bottom upwards, i.e. from the zone of material 2 that has the lowest concentration of contaminants, especially containing the least moisture, to the zone of material 2 having the highest concentration of contaminants, especially containing the most moisture. The bearing hydrogen then exits the trap 1 via the tap 5. This bearing hydrogen may be expelled to the external atmosphere 16 with the water it contains or alternatively may be cooled to room temperature via the cooling-condenser element 14 to condense the liquid water before being mixed with the hydrogen stream F2. This second solution may preferably be performed if the user device 11 tolerates humid hydrogen (for example a fuel cell).

In a second variant with reference to FIG. 9 during a phase of destocking of hydrogen and of regeneration of the trap 1, the regeneration step comprises:
    a step of supplying a stream F3 of neutral gas such as argon or nitrogen, originating from a neutral gas source 15,
    a step of using the stream F3 of neutral gas to perform the step of evacuating the impurities from the trap 1,
    and a step of heat exchange, especially contactless and performed in the heat exchanger 4, between the total stream FT of hydrogen that has undergone desorption and the material 2 so that the heat generated during the desorption step and carried by the total stream FT is used to heat the material 2 in a manner allowing the evacuation step to be performed.

Said neutral gas is preferentially dry: the level of purity of the flushing gas especially conditions the depth of regeneration. The content of $H_2O$ in the neutral gas is preferentially less than 1000 ppm.

Preferentially, the step of using the stream F3 of neutral gas comprises the flushing of the material 2 with the stream F3 of neutral gas with direct contact with the material 2 and the process comprises a step of expelling the stream F3 of neutral gas and of the impurities released from the material 2 during the step of evacuation to the external atmosphere 16, this expulsion step being performed after the evacuation step mentioned previously. In this case, the hydrogen destocked is pure and fully available for the user device 11.

With reference to FIG. 8 during a phase of hydrogen destocking and of cooling of the trap 1, the cycle of steps comprises, after the step of regenerating the trap 1 by means of the heat recovered from the destocked hydrogen, a step of cooling said at least one trap 1, especially at the level of the material 2, performed in the heat exchanger 4 before performing a following cycle of steps. This step of cooling of said at least one trap comprises the following successive steps:

- a step of cooling of the hydrogen exiting the reactor 10 after the desorption step, performed in a cooling element 12,
- a step of heat exchange, especially contactless and performed in the heat exchanger 4, between the hydrogen that has undergone this cooling step and the material 2 of said at least one trap 1, so that the hydrogen takes heat from the material 2,
- a step of evacuating from said at least one trap 1 heat taken from the material 2 during this heat exchange step, performed by evacuating from said at least one trap 1 the hydrogen that has undergone this heat exchange step.

This allows the trap 1 to be cooled in order once again to be efficient during a following absorption of hydrogen by the hydrides. The total stream FT of hydrogen exiting the reactor 10 passes via the cooling element 12 before passing into the heat exchanger 4 in order to take heat from the material 2.

With reference now to FIG. 10, the purification step performed to filter the impurities contained in the hydrogen entering the tank 10 for storage is performed alternately in a first trap 1A and a second trap 1B which are different from each other and operating synchronously such that the step of cooling of the first trap 1A is performed during the purification step performed by the second trap 1B and such that the step of cooling of the second trap 1B is performed during the purification step performed by the first trap 1A.

Specifically, it may be envisaged to place the two traps 1A, 1B in parallel and operating alternately. The hydrogen purified at room temperature by one of the traps may be directed to the heat exchanger 4 of the other trap so as to cool it. It is also possible to use another cooling system independent of the heat exchanger 4 to perform the cooling of the trap that has just been regenerated.

One way of performing this last variant is to envisage the following steps:

- during the destocking phase, the hydrogen exits hot from the hydride tank 10 and passes through the trap 1A; the trap 1A rises in temperature and thus undergoes regeneration; the trap 1B is not active at this moment or, alternatively, it continues to be cooled by an external cold source,
- during the following storage phase, the wet hydrogen passes through the trap 1B: its moisture content decreases, the gas is purified before being stored in the tank 10; during this phase, the trap 1A is cooled either by the hydrogen purified by the trap 1B, or by an external cold source,
- during the following phase of destocking of the tank 10, the hydrogen exits hot from the tank 10 and passes through the trap 1B; the trap 1B thus undergoes regeneration; the trap 1A is not active at this time or, alternatively, it continues to be cooled by an external cold source,
- during the following storage phase, the hydrogen passes through the trap A: its moisture content decreases, the gas is purified before being stored in the tank 10: during this phase, the trap 1B is cooled either by the hydrogen purified by the trap 1A, or by an external cold source.

This alternative functioning in reference to FIG. 10 makes it possible to purify the hydrogen entering the tank 10 in the case where the cooling time of the traps 1A, 1B is of the same order of magnitude as the storage time of the tank 10. These provisions are useful in particular when the cycle time of the tank 10 is short (less than a few hours) and would not allow complete cooling of a single trap.

The invention claimed is:

1. Process for storing and destocking hydrogen in a hydride tank, comprising:
   purifying hydrogen from impurities, the purifying being performed on at least one trap that filters the impurities contained in the hydrogen entering the tank in order to be stored, and
   regenerating said at least one trap, by exchanging heat carried by at least a portion of a stream of the hydrogen exiting the tank after its destocking with a material of the at least one trap, so that the heat carried by the hydrogen exiting the tank after its destocking is used to heat said material.

2. The process according to claim 1, wherein the regeneration is stopped after a predefined time of performing the regeneration or when the moisture content of the stream of hydrogen exiting said at least one trap is below a predefined threshold.

3. The process according to claim 1, comprising the cycle of the following successive actions:
   said purification,
   absorbing, by the hydrides of the tank, the purified hydrogen exiting said at least one trap,
   desorbing the hydrogen by hydrides of the tank,
   said regeneration in which the heat carried out of the tank by the hydrogen destocked at the time of the desorption is used to heat the material of said at least one trap that is capable of reversibly retaining during the purification the impurities contained in the hydrogen prior to said absorption.

4. The process according to claim 3, wherein the regeneration comprises exchanging heat between all of the stream of hydrogen which has undergone said desorption and said material of the trap.

5. The process according to claim 3, wherein the regeneration comprises evacuating from the trap the impurities filtered and retained beforehand by said material.

6. The process according to claim 5, wherein the regeneration comprises:
   separating a total stream of hydrogen which has undergone said desorption into first and second separate streams,
   using only said first stream to perform said evacuation, and
   exchanging heat between only said second stream and said material so that the heat generated during the desorption and carried by said second stream is used to heat said material in a manner allowing said evacuation to be performed by the first stream.

7. The process according to claim 6, wherein said using only said first stream comprises flushing said material with said first stream with direct contact with said material.

8. The process according to claim 6, comprising expelling said first stream and the impurities released from said material during said evacuating to the external atmosphere, performed after said evacuation.

9. The process according to claim 6, comprising cooling said first stream and the impurities released from said material during said evacuation to condense the liquid water, followed by mixing said first cooled stream and said second stream.

10. The process according to claim 5, wherein the regeneration comprises:
   supplying a stream of neutral gas, originating from a source of neutral gas,
   using said stream of neutral gas to perform said evacuation, and
   exchanging heat between a total stream of hydrogen that has undergone said desorption and said material so that the heat generated during the desorption and carried by said total stream is used to heat said material in a manner allowing said evacuation to be performed.

11. The process according to claim 10, wherein said using said stream of neutral gas comprises flushing said material with said stream of neutral gas with direct contact with said material and said process comprises expelling said stream of neutral gas and the impurities released from said material during said evacuating to the external atmosphere, performed after said evacuation.

12. The process according to claim 3, wherein the cycle comprises, after the regeneration, cooling said at least one trap, performed before performing a following cycle.

13. The process according to claim 12, wherein said cooling said at least one trap comprises the following successive actions:
   cooling the hydrogen exiting the tank after the desorption, performed on a cooling element,
   exchanging heat between the hydrogen which has undergone said cooling and said material of said at least one trap, so that the hydrogen takes heat from said material, and
   evacuating from said at least one trap heat taken from said material during said heat exchange, performed by evacuating from said at least one trap the hydrogen that has undergone said heat exchange.

14. The process according to claim 12, wherein said purification is performed alternately on first and second different traps operating synchronously so that the cooling of the first trap is performed during the purification performed by the second trap and so that the cooling of the second trap is performed during the purification performed by the first trap.

15. Installation for storing and destocking hydrogen, comprising:
   a hydride tank in which hydrogen enters to be stored and from which the hydrogen exits to be destocked,
   at least one trap for filtering out impurities contained in the hydrogen entering the tank to be stored, and
   at least one of (i) computer software and (ii) computer hardware configured to control performance of a process for storing and destocking hydrogen in the hydride tank, comprising
   purifying hydrogen from impurities, the purifying being performed on the at least one trap that filters the impurities contained in the hydrogen entering the tank in order to be stored, and
   regenerating the at least one trap, by exchanging heat carded by a stream of the hydrogen exiting the tank after its destocking with a material of the at least one trap, so that the heat carried by the hydrogen exiting the tank after its destocking is used to heat said material,
   the installation including a device which ensures that the regeneration of the at least one trap uses the heat carried by the hydrogen exiting the tank after it has been destocked by exchanging the heat carried by a stream of the hydrogen exiting the tank after its destocking with the material of the at least one trap.

16. The installation according to claim 15, wherein said at least one trap comprises a material that is capable of reversibly retaining the impurities contained in the hydrogen prior to storage of said hydrogen in the tank and wherein said device comprises a heat exchange element for heat exchange between all or part of the total stream of hydrogen exiting the tank and said material of the trap.

17. The installation according to claim 16, wherein said device comprises elements for flushing said material with a gaseous stream with direct contact with said material so that said gaseous stream evacuates from the trap impurities filtered and retained beforehand by said material.

18. The installation according to claim 17, comprising elements for ensuring that said gaseous stream is constituted by a fraction of the total stream of hydrogen exiting the tank.

19. The installation according to claim 15, wherein the hydride tank comprises magnesium-based hydrides.

20. The installation according to claim 15, wherein the heat exchange is contactless.

21. The process according to claim 1, wherein the hydride tank comprises magnesium-based hydrides.

22. The process according to claim 1, wherein the heat exchange is contactless.

* * * * *